United States Patent [19]

Kadoya

[11] Patent Number: 5,792,433

[45] Date of Patent: Aug. 11, 1998

[54] LIGHT IRRADIATING DEVICE WITH EASILY REPLACEABLE LIGHT IRRADIATING LAMPS

[75] Inventor: Masahiro Kadoya, Hachioji, Japan

[73] Assignee: Photoscience Japan Corporation, Japan

[21] Appl. No.: 613,041

[22] Filed: Mar. 8, 1996

[30] Foreign Application Priority Data

Mar. 13, 1995 [JP] Japan .................................... 7-079349
Mar. 13, 1995 [JP] Japan .................................... 7-079350

[51] Int. Cl.[6] .................................................. C02F 1/32
[52] U.S. Cl. .................................. 422/186.3; 422/24
[58] Field of Search ............................. 422/186.3, 24

[56] References Cited

U.S. PATENT DOCUMENTS

| Re. 34,513 | 1/1994 | Ellner | 250/432 R |
|---|---|---|---|
| 3,182,193 | 5/1965 | Ellner et al. | 250/43.5 |
| 3,562,520 | 2/1971 | Hippen | 250/43 |
| 4,141,686 | 2/1979 | Lewis | 250/436 |
| 4,141,830 | 2/1979 | Last | 210/63 Z |
| 4,204,956 | 5/1980 | Flatow | 210/87 |
| 4,296,066 | 10/1981 | Schenck | 422/24 |
| 4,297,222 | 10/1981 | Takeguchi et al. | 210/748 |
| 4,317,041 | 2/1982 | Schenck | 250/435 |
| 4,336,223 | 6/1982 | Hillman | 422/24 |
| 4,372,860 | 2/1983 | Kaas | 210/748 |
| 4,400,270 | 8/1983 | Hillman | 210/103 |
| 4,438,337 | 3/1984 | Forrat | 250/436 |
| 4,471,225 | 9/1984 | Hillman | 250/436 |
| 4,482,809 | 11/1984 | Maarschalkerweerd | 250/436 |
| 4,535,247 | 8/1985 | Kurtz | 250/436 |
| 4,621,195 | 11/1986 | Larsson | 250/438 |
| 4,757,205 | 7/1988 | Latel et al. | 250/436 |
| 4,767,932 | 8/1988 | Ellner | 250/435 |
| 4,769,131 | 9/1988 | Noll et al. | 210/85 |
| 4,798,702 | 1/1989 | Tucker | 422/24 |
| 4,825,083 | 4/1989 | Latel et al. | 250/436 |
| 4,849,115 | 7/1989 | Cole et al. | 210/748 |
| 4,853,581 | 8/1989 | Goudy, Jr. | 313/15 |
| 4,872,980 | 10/1989 | Maarschalkerweerd | 210/243 |
| 4,876,014 | 10/1989 | Malson | 210/668 |
| 4,897,246 | 1/1990 | Peterson | 422/186.3 |
| 4,899,056 | 2/1990 | Ellner | 250/431 |
| 4,952,376 | 8/1990 | Peterson | 422/186.3 |
| 4,963,750 | 10/1990 | Wilson | 250/436 |
| 4,968,437 | 11/1990 | Noll et al. | 210/748 |
| 4,968,489 | 11/1990 | Peterson | 422/186.3 |
| 4,968,891 | 11/1990 | Jhawar et al. | 250/438 |
| 4,971,687 | 11/1990 | Anderson | 210/85 |
| 5,006,244 | 4/1991 | Maarschalkerweerd | 210/243 |
| 5,019,256 | 5/1991 | Ifill et al. | 210/232 |
| 5,133,945 | 7/1992 | Hallett | 422/186.3 |

(List continued on next page.)

*Primary Examiner*—Daniel J. Jenkins
*Attorney, Agent, or Firm*—Graham & James LLP

[57] ABSTRACT

The present invention provides a simplifed construction of a light irradiating device having light irradiating modules by facilitating the attachment of a plurality of light-transmitting tubes containing light irradiating lamps to a frame. The present invention further simplifies the manufacture of the overall light irradiating device by installing a plurality of such light irradiating modules as detachable integral units inside a housing.

Light irradiating lamps are accommodated inside light-transmitting tubes, each of which is closed off at one end and open at the other end. The open end portions of a plurality of said light-transmitting tubes are attached in a detachable, water-tight manner to connectors installed on a frame, and the closed end portions of said light-transmitting tubes are attached in a detachable manner to detachable holders which are installed on the aforementioned frame, thus forming a light irradiating module. Such light irradiating modules are installed as detachable integral units inside a housing, thus forming flow paths in which light irradiation treatments such as the eradication of bacteria in liquids, the oxidative decomposition of organic matter or the decomposition of harmful substances, etc., can be performed.

10 Claims, 2 Drawing Sheets

U.S. PATENT DOCUMENTS

| | | | |
|---|---|---|---|
| 5,147,532 | 9/1992 | Leek, Jr. | 210/97 |
| 5,151,174 | 9/1992 | Wiesmann | 210/97 |
| 5,166,527 | 11/1992 | Solymar | 250/436 |
| 5,178,758 | 1/1993 | Hwang | 210/256 |
| 5,208,461 | 5/1993 | Tipton | 250/436 |
| 5,227,140 | 7/1993 | Hager et al. | 422/186.3 |
| 5,230,792 | 7/1993 | Sauska et al. | 210/97 |
| 5,266,215 | 11/1993 | Engelhard | 210/748 |
| 5,316,673 | 5/1994 | Kohlmann et al. | 210/251 |
| 5,320,749 | 6/1994 | Mullen | 210/199 |
| 5,322,569 | 6/1994 | Titus et al. | 134/1 |
| 5,332,388 | 7/1994 | Schuerch et al. | 422/291 |
| 5,352,359 | 10/1994 | Nagai et al. | 210/192 |
| 5,366,705 | 11/1994 | Reidy | 422/243 |
| 5,368,826 | 11/1994 | Weltz et al. | 422/243 |
| 5,376,281 | 12/1994 | Safta | 210/748 |
| 5,393,419 | 2/1995 | Tiede et al. | 210/192 |
| 5,395,522 | 3/1995 | Melanson et al. | 210/202 |
| 5,401,474 | 3/1995 | Hager et al. | 422/186.3 |
| 5,413,768 | 5/1995 | Stanley, Jr. | 422/186.3 |
| 5,418,370 | 5/1995 | Maarschalkerweerd | 250/431 |
| 5,446,289 | 8/1995 | Shodeen et al. | 250/455.11 |
| 5,466,425 | 11/1995 | Adams | 422/186.3 |
| 5,468,350 | 11/1995 | Ban | 202/176 |
| 5,471,063 | 11/1995 | Hayes et al. | 250/436 |
| 5,474,748 | 12/1995 | Szabo | 422/186.04 |
| 5,501,843 | 3/1996 | Peterson | 422/186.3 |

LIGHT IRRADIATING DEVICE WITH EASILY REPLACEABLE LIGHT IRRADIATING LAMPS

BACKGROUND OF THE INVENTION

1. Field of the Invention

The present invention concerns a light irradiating device which performs light irradiation treatments on liquids containing bacteria, organic matter or harmful substances, etc., and thus eradicates the bacteria in said liquids, oxidatively decomposes the aforementioned organic matter or decomposes the aforementioned harmful substances, etc., so that treated liquids which are free of such bacteria, organic matter or harmful substances, etc., can be obtained.

2. Background of the Prior Art and Related Information

In most conventional light irradiating devices, for example, of a type where ultraviolet lamps are used as light irradiating lamps, the ultraviolet lamps are installed inside light-transmitting tubes, and are attached one by one (at an appropriate spacing) to side surfaces or parts, etc., inside a housing. In such cases, the installation of a plurality of light-transmitting tubes containing ultraviolet lamps at an appropriate spacing in multiple vertical ranks and multiple rows is extremely laborious, so that manufacturing costs are increased.

Furthermore, in the case of conventional ultraviolet irradiating devices, contaminants such as organic matter, etc., contained in the liquid being treated may adhere to the outside surfaces of the ultraviolet-transmitting tubes containing the ultraviolet lamps while said liquid is being subjected to an ultraviolet irradiation treatment, so that the ultraviolet irradiation efficiency drops. The conventional practice in such cases is to clean the outside surfaces of the transmitting tubes manually by inserting a person's hands between the contaminated transmitting tubes inside the housing. However, since there is insufficient space inside the housing and between the transmitting tubes, such manual cleaning is inadequate.

Moreover, in cases where the above mentioned manual cleaning is inadequate in such conventional ultraviolet irradiating devices, the ordinary practice has been to disassemble the ultraviolet irradiating device, remove the contaminated transmitting tubes one by one, and clean the outside surfaces of said transmitting tubes by hand. Such disassembly work and manual cleaning work are a waste of time and money, and lead to a drop in the treatment efficiency.

Furthermore, in cases where the ultraviolet lamps inside the housing suffer a broken connection or damage while a liquid is being subjected to an ultraviolet irradiation treatment, the ultraviolet irradiating device is disassembled, and the disconnected or damaged ultraviolet lamps are removed one by one and replaced. Here, as in the case described above, such disassembly work and manual replacement work are a waste of time and money, and lead to a drop in the treatment efficiency.

Moreover, in some conventional ultraviolet irradiating devices, a plurality of transmitting tubes containing ultraviolet lamps are attached to a frame, and this frame is installed inside a housing. However, most devices of this type have a simple supporting structure in which both ends of the transmitting tubes containing the ultraviolet lamps (or the ultraviolet lamps themselves) are merely sealed to the frame. Accordingly, there are problems with the transmitting tube supporting structure, in terms of both physical strength and attachment precision.

Specifically, when the frame with attached transmitting tubes containing ultraviolet lamps is carried or cleaned, the application of even a moderate amount of force to the frame or transmitting tubes may cause cracking in the areas where the transmitting tubes are attached to the frame. As a result, the seal may be broken so that leakage occurs, or the ultraviolet transmitting-tubes may fall out of the frame. Furthermore, the ultraviolet lamps may shift so that they are no longer maintained at equal intervals inside the transmitting tubes, thus making it difficult to maintain stable ultraviolet irradiation.

Furthermore, conventional ultraviolet irradiating devices include devices in which both ends of the transmitting tubes containing the ultraviolet lamps are fastened in a detachable manner to attachment parts such as sockets, etc., which are installed on the aforementioned frame, and this frame is installed inside a housing. However, since both ends of each transmitting tube are clamped between the attachment parts (sockets, etc.) on the frame without any gap being left, the installation and removal of transmitting tubes containing ultraviolet lamps cannot be performed simply and easily. This leads to a drop in the treatment efficiency.

Furthermore, in the conventional ultraviolet irradiating devices described above, the electrical lead wires connected to the ultraviolet lamps contained in the transmitting tubes are usually installed along the outside surfaces of the frame so that the layout of said electrical lead wires is poor. As a result, the electrical lead wires may be damaged or broken as a result of contact with the frame or housing, or said electrical lead wires may corrode and deteriorate as a result of exposure to ultraviolet light and ozone, thus making it necessary to repair or replace the electrical wires, which is a difficult operation.

Furthermore, small-size ultraviolet irradiating tubes include devices in which a single ultraviolet-transmitting tube containing an ultraviolet lamp is inserted into a treatment tube, a cleaning part to which a brush, etc., is attached is inserted so that said cleaning part can slide along the transmitting tube, and the transmitting tube is cleaned by causing said cleaning part to perform a reciprocating motion along the outside surface of the transmitting tube so that contaminants adhering to the outside surface of the transmitting tube are stripped away.

However, such conventional ultraviolet irradiating tubes using a cleaning part are devices in which a single transmitting tube containing an ultraviolet lamp is inserted into a treatment tube, and are not devices in which a plurality of transmitting tubes are automatically cleaned at the same time. In such devices, furthermore, the cleaning part is formed as an integral part of the transmitting tube; accordingly, in cases where the ultraviolet lamp is to be replaced, it is necessary to disassemble both the treatment tube and the cleaning part before the ultraviolet lamp can be removed from the housing and replaced. This is an extremely laborious operation, and results in an extremely poor treatment efficiency.

SUMMARY OF THE INVENTION

The present invention ameliorates the drawbacks of conventional light irradiating devices. One object of the present invention is to facilitate the attachment of the light-transmitting tubes containing light irradiating lamps to a frame (and the detachment of said tubes from said frame) by closing off one end of each of a plurality light-transmitting tubes containing light irradiating lamps so that sealing is unnecessary, and attaching said light-transmitting tubes (in a detachable manner) to respective connectors and detachable holders which are installed on the frame, thus simplifying the construction of a light irradiating module. Furthermore, another object of the present invention is to simplify the manufacture of the aforementioned light irradiating device by installing a plurality of light irradiating modules (formed as described above) parallel to each other at intervals as detachable integral units inside a housing.

Furthermore, another object of the present invention is to improve the efficiency of light irradiation treatments of liquids by forming light irradiating modules, each consisting of a plurality of light-transmitting tubes containing light irradiating lamps, as single units, so that these modules can be simply and easily removed from the device by a one-touch operation, thus allowing easy removal of the respective light-transmitting tubes from the corresponding connectors and detachable holders so that the light irradiating lamps can easily be cleaned or replaced (without any need for an operation in which light-transmitting tubes which have become contaminated as a result of the light irradiation treatment of a liquid or light-transmitting tubes containing light irradiating lamps which have been disconnected or damaged are removed one by one and cleaned or replaced).

Moreover, another object of the present invention (in regard to the attachment of a plurality of light-transmitting tubes containing light irradiating lamps to the frame) is to achieve a great improvement in the physical strength and attachment precision of the supporting structure of the light-transmitting tubes by attaching said light-transmitting tubes directly (without sealing) and in a detachable manner to connectors and detachable holders which are installed on the frame. By extension, another object of the present invention is to strengthen the attachment of the light-transmitting tubes to the frame so that even if a considerable force should be applied to the light-transmitting tubes attached to the frame while said frame is being carried or cleaned, there is no rupturing of seals or liquid leakage, and the light irradiating lamps are maintained at a uniform spacing inside the light-transmitting tubes so that stable light irradiation can be maintained.

Furthermore, another object of the present invention (in regard to the connection of electrical lead wires to the light irradiating lamps contained in the aforementioned light-transmitting tubes) is to improve the layout of the electrical lead wires by installing said electrical lead wires inside a hollow frame (rather than installing said lead wires on the outside of the frame), so that damage or disconnection of the electrical lead wires is prevented, and so that corrosion or deterioration of the electrical lead wires caused by ultraviolet light or ozone is also prevented.

In addition, another object of the present invention (in regard to cases where the aforementioned plurality of light-transmitting tubes in a light irradiating module have become contaminated as a result of the light irradiation treatment of a liquid) is to provide for automatic simultaneous cleaning of a plurality of light-transmitting tubes while the liquid being treated is undergoing a light irradiation treatment, so that light irradiation treatments of liquids can be performed continuously (thus greatly improving the efficiency of such light irradiation treatments) without lowering the purity of the liquid being treated, and without any need to interrupt the treatment and disassemble the device for cleaning.

The present invention provides a light irradiating device with easily replaceable light irradiating lamps. In accordance with the present invention [a] light irradiating lamps are installed inside light-transmitting tubes, each of which is closed at one end and open at the other end, [b] the open end portions of a plurality of said light-transmitting tubes are attached in a water-tight manner (so that said tubes are also detachable) to connectors which are installed at intervals on a frame, and the closed end portions of said plurality of light-transmitting tubes are attached (in a detachable manner) to detachable holders which are installed at intervals on the aforementioned frame, thus forming a light irradiating module, and [c] this light irradiating module is assembled as a detachable integral unit inside a housing, thus forming flow paths in which a light irradiation treatment such as the eradication of bacteria in a fluid, the oxidative decomposition of organic matter or the decomposition of harmful substances, etc., is performed. In this way, the present invention facilitates the detachment of the light irradiating lamps from the frame in the light irradiating module.

Furthermore, in accordance with the present invention [a] the frame of the aforementioned light irradiating device with easily replaceable light irradiating lamps is made hollow, [b] electrical lead wires are installed inside said hollow frame, and [c] these electrical lead wires are connected to light irradiating lamps which are attached in a water-tight manner (so that said lamps are also detachable) to connectors installed on said hollow frame, so that damage, corrosion and deterioration of the electrical lead wires are prevented and the layout of said electrical lead wires is improved.

In addition, in accordance with the present invention, a plurality of the aforementioned light irradiating modules are installed parallel to each other at intervals as detachable integral units inside a housing, thus increasing the light irradiation treatment capacity and improving the light irradiation treatment efficiency.

Furthermore, in accordance with the present invention cleaning parts which slide along the outside surfaces of the respective light-transmitting tubes are attached in a detachable manner, and contaminants adhering to the outside surfaces of the light-transmitting tubes are stripped from said light-transmitting tubes by these cleaning parts in the presence of the liquid being treated (during the light irradiation treatment of said liquid), so that the light irradiation treatment efficiency is improved.

In the case of the aforementioned plurality of light-transmitting tubes containing light irradiating lamps, one end of each of said tubes is sealed; accordingly, there is no need to seal this part of each tube. Furthermore, since the aforementioned plurality of light-transmitting tubes are attached in a detachable manner to respective connectors and detachable holders installed on the aforementioned frame, the detachment of the light-transmitting tubes containing the light irradiating lamps from the frame is facilitated, and the formation of light irradiating modules is simplified. In addition, the construction of a light irradiating device by installing a plurality of such light irradiating modules parallel to each other as integral units inside a housing is also simplified.

The aforementioned light irradiating modules comprising of a plurality of light-transmitting tubes containing light irradiating lamps can easily be removed from the device as units by means of a one-touch operation. Accordingly, the detachable holders installed on the frame can be removed, and the light-transmitting tubes can be pulled out of the aforementioned connectors, and easily cleaned or replaced in a short period of time.

Since the light-transmitting tubes containing the aforementioned light irradiating lamps are held by the aforementioned connectors and detachable holders installed on the frame, the physical strength and attachment precision of the supporting structure of the light-transmitting tubes are improved. Accordingly, the attachment of the light-transmitting tubes to the frame is strengthened, so that any rupturing of seals or liquid leakage that might occur when force is applied to the light-transmitting tubes (attached to the frame) during carrying or cleaning is eliminated. Furthermore, stable light irradiation can be accomplished by the light irradiating lamps, which are maintained at a uniform spacing inside the light-transmitting tubes.

Since the electrical lead wires are installed inside the aforementioned hollow frame, the layout of said electrical lead wires is improved, so that there is no damage or disconnection of electrical lead wires when the light irradiating modules are installed inside the aforementioned housing. Furthermore, since the electrical lead wires are covered by the frame and the connectors, said electrical lead wires are protected from corrosion and deterioration caused by ultraviolet light or ozone.

Since contaminants which adhere to the plurality of light-transmitting tubes in the light irradiating module are stripped away by the aforementioned cleaning parts during the light irradiation treatment of the liquid being treated, light irradiation treatments of liquids can be performed continuously without lowering the purity of the liquid being treated, and without interrupting the treatment and disassembling the device for cleaning.

DETAILED DESCRIPTION OF THE INVENTION

Figure 1:
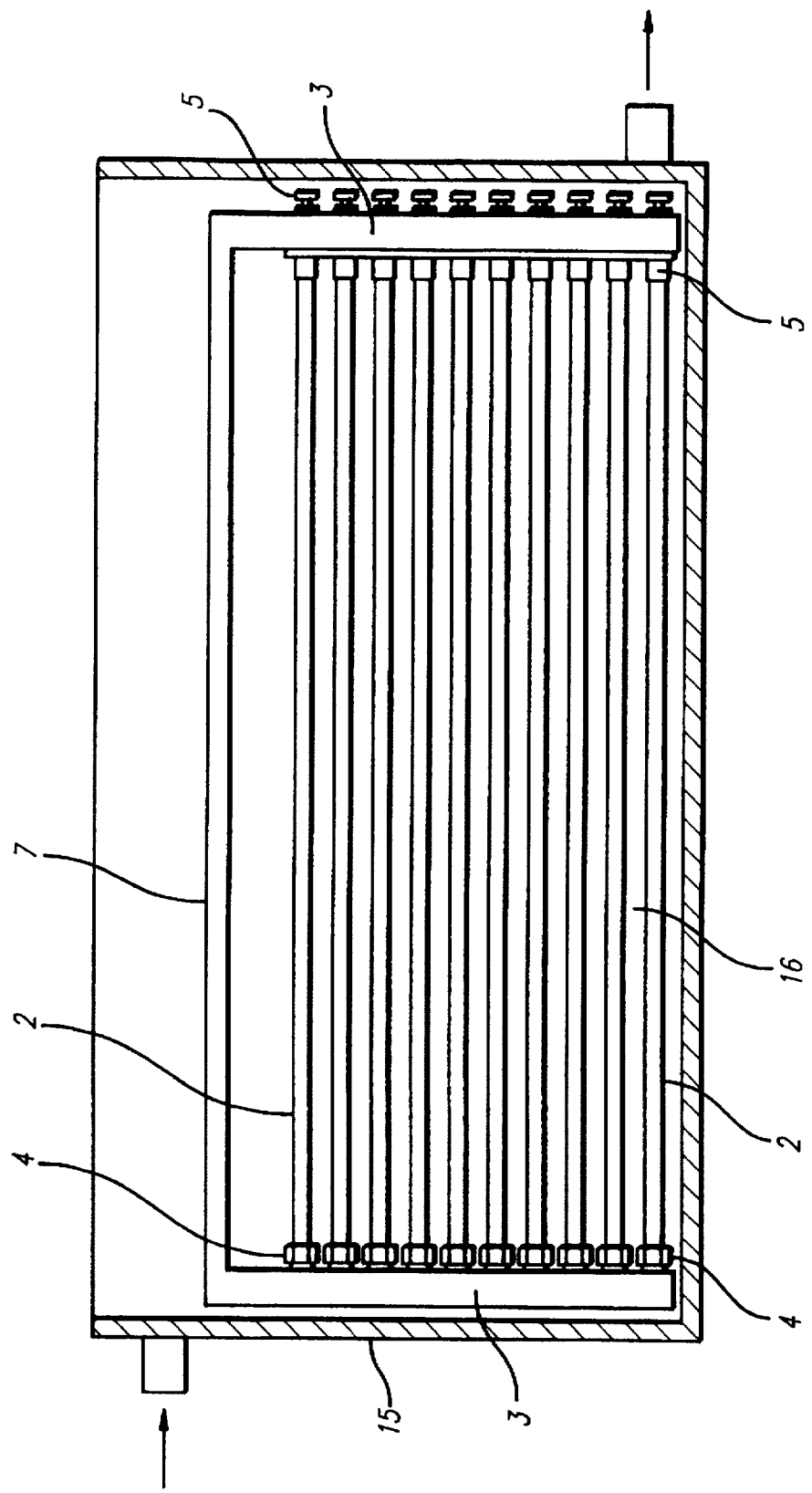
FIG. 1 is a sectional view of an ultraviolet irradiating device which illustrates the installation of an ultraviolet irradiating module (in which light-transmitting tubes containing ultraviolet lamps are attached to a frame) in a housing according to the present invention.
Figure 2:
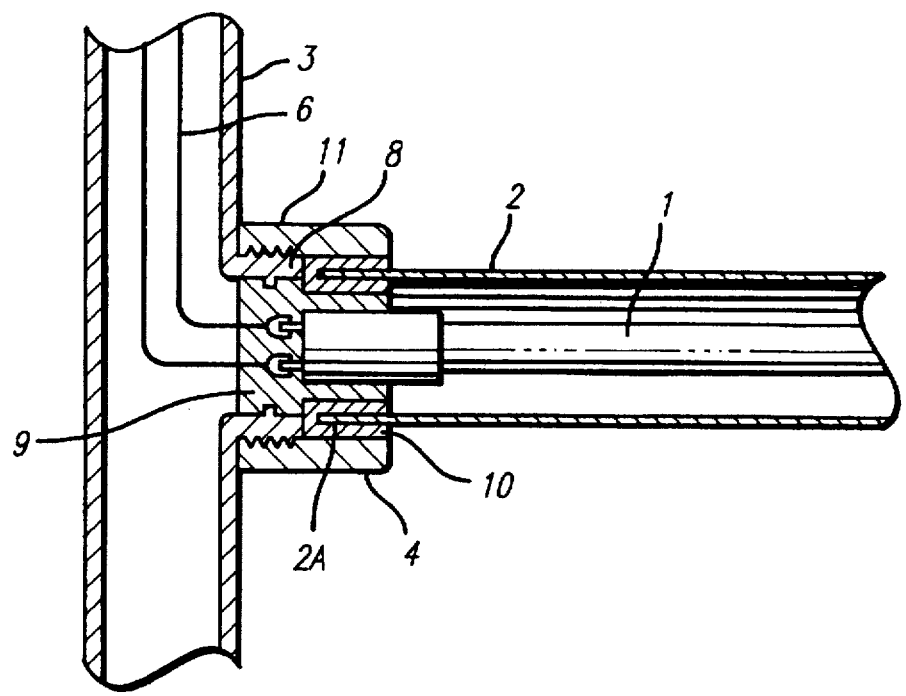
FIG. 2 is an enlarged sectional view of an ultraviolet irradiating module which illustrates the attachment of one end of each of the aforementioned light-transmitting tubes containing an ultraviolet irradiating lamp to a connector attached to the aforementioned frame in the present invention.
Figure 3:
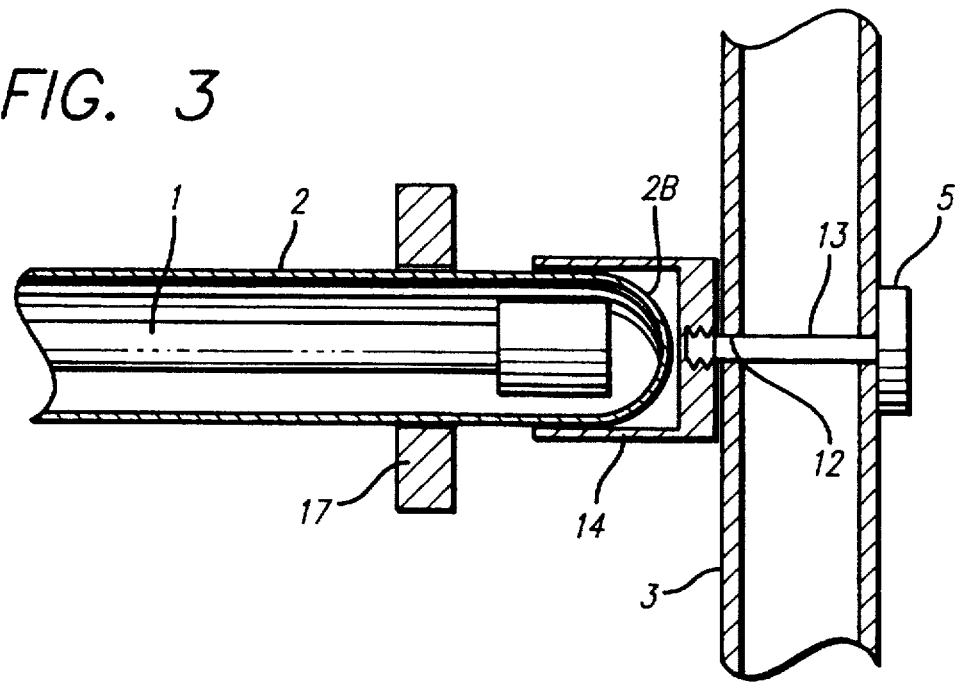
FIG. 3 is an enlarged sectional view of an ultraviolet irradiating module which illustrates the attachment of the other end of each of the aforementioned light-transmitting tubes containing an ultraviolet irradiating lamp to a detachable holder attached to the aforementioned frame in the present invention.

The light irradiating device with easily replaceable light irradiating lamps provided by the present invention may be described as follows:

As is shown in FIGS. 1-3, ultraviolet lamps 1 are accommodated inside transmitting tubes 2 made of quartz glass, each of which is closed at one end and open at the other end. A plurality of these transmitting tubes 2 are attached (in a detachable manner) to a square frame 3, with said tubes 2 being installed in a multi-level arrangement having an appropriate vertical spacing.

Such an attachment of the transmitting tubes 2 containing the ultraviolet lamps 1 to the frame 3 (in a detachable manner) in a multi-level arrangement with an appropriate vertical spacing is accomplished as follows: i.e., the open end portions 2A of the transmitting tubes 2 are attached to the frame 3 in a water-tight state via connectors 4 which are installed on the frame 3 at intervals, and the closed end portions 2B of the transmitting tubes 2 are connected to the frame 3 via detachable holders 5 which are similarly installed on the frame 3 at intervals.

Furthermore, an ultraviolet irradiating module 7 is formed by connecting electrical lead wires 6 to the ultraviolet lamps 1 contained in the transmitting tubes 2. These electrical lead wires 6 may be installed on the outer surfaces of the frame 3, or may be run through a hollow frame 3; said electrical lead wires 6 are connected to the ultraviolet lamps 1 (attached to the frame 3) via the open end portions 2A of the transmitting tubes 2 and the connectors 4.

If the ultraviolet lamps 1 and open end portions 2A of the transmitting tubes 2 are thus attached to the frame 3 via the aforementioned connectors 4, said ultraviolet lamps 1 and open end portions 2A of the transmitting tubes 2 can be firmly and stably fastened to the frame 3. Furthermore, each ultraviolet lamp 1 can be securely positioned in the center of the corresponding transmitting tube 2. In addition, the detachment of the ultraviolet lamps 1 and open end portions 2A of the transmitting tubes 2 from the frame 3 is facilitated, so that the ultraviolet lamps 1 can easily be removed from the frame 3 and replaced in a short time.

Furthermore, if the closed end portions 2B of the transmitting tubes are attached to the frame 3 via the aforementioned detachable holders 5 as described above, said closed end portions 2B of the transmitting tubes 2 can be stably fastened to the frame 3. Furthermore, the closed end portions 2B of the transmitting tubes 2 can easily be removed from the frame 3 simply by removing the detachable holders 5.

Moreover, if the electrical lead wires 6 are run through the aforementioned hollow frame 3 and connected to the ultraviolet lamps 1 as described above, said electrical lead wires 6 can be protected from corrosion by liquids, and can also be protected from deterioration caused by exposure to ultraviolet light. In such a case, furthermore, the electrical lead wires 6 are accommodated inside the hollow frame 3 so that the layout of said wires is improved; accordingly, there is no damage or breakage of said electrical lead wires 6 during the attachment or detachment of the ultraviolet irradiating module 7.

Low-pressure ultraviolet lamps with a principal wavelength of 254 nm, low-pressure ultraviolet lamps with principal wavelengths of 185 nm and 254 nm, or medium- to low-pressure ultraviolet lamps with principal wavelengths of 185 nm, 254 nm and 365 nm, may be used as the aforementioned ultraviolet lamps 1. Furthermore, besides the above mentioned ultraviolet lamps, various other types of light irradiating lamps which emit wavelengths of 700 nm or less, such as solar ultraviolet lamps, chemical lamps, black-light lamps, metal halide lamps or sodium lamps., etc., may be used (depending on the intended ultraviolet chemical reaction treatment).

Transmitting tubes 2 which have an open end portion 2A at one end and a closed end portion 2B at the other end are used as the aforementioned transmitting tubes 2. In addition to quartz glass, Teflon may also be used as the material of the aforementioned transmitting tubes 2. Furthermore, any other material which has a high transmissivity for light such as ultraviolet light, etc., may also be used.

Besides being formed in a square shape as described above, the frame 3 could also be formed in a C shape, an I-beam shape, or some other shape which has physical strength. Furthermore, in addition to the aforementioned stainless steel, other materials which have physical strength, which do not show any elution of impurities and which are not corroded by liquids or ultraviolet light (e. g. ceramics or plastics, etc.), may also be used as the material of the frame 3.

The aforementioned connectors 4 may be constructed as follows: e. g., as is shown in FIG. 2, an attachment ring 8 which has screw threads formed on its outer surface is fastened to the frame 3. A cap-form holder 9 is inserted into this attachment ring 8, and contacts are installed in this holder 9 so that the tip portions of the electrical lead wires 6 which are run through the hollow frame 3 are shielded. This structure is arranged so that when an ultraviolet lamp 1 is inserted and fastened to the inside surface of the holder 9, the contacts of the electrical lead wires 6 and the contacts of the ultraviolet lamp 1 are connected. Furthermore, the aforementioned transmitting tube 2 is inserted (in a detachable manner) and fastened in place so that said tube 2 fits over the outer surface of the holder 9. Packing 10 is installed on the outer surface of the transmitting tube 2, and a cover 11 which has screw threads formed on its inside surface is screwed onto the screw threads of the attachment ring 8 (in a detachable manner), so that the ultraviolet lamp 1 and transmitting tube 2 are attached to the frame 3 in a water-tight manner.

Besides connectors constructed as described above, it would also be possible to use connectors constructed as easily removable clamps, etc., as the aforementioned connectors 4. Furthermore, connectors of any type of construction may be used, as long as said connectors are constructed so that the aforementioned ultraviolet lamps 1 and transmitting tubes 2 can be attached to the frame 3 in a detachable, water-tight manner.

The aforementioned detachable holders 5 may be constructed as follows: e. g., as is shown in FIG. 3, a threaded movable rod 13 is screwed into a threaded attachment hole 12 formed in the frame 3, so that said movable rod 13 can be rotated. A supporter 14 is installed on one end of the aforementioned movable rod 13, and said movable rod 13 is rotated so that the supporter 14 is caused to move, thus causing the closed end portion 2B of the transmitting tube 2 to be enveloped and supported by said supporter 14.

Besides detachable holders constructed as described above, it would also be possible to use connectors with a locking structure allowing easy movement of the aforementioned supporter 14 as the aforementioned detachable holders 5. Furthermore, supporting parts of any type of construction may be used, as long as said supporting parts are constructed so that the closed end portions 2B of the transmitting tubes 2 can be supported in a detachable manner.

By installing a plurality of the aforementioned ultraviolet irradiating modules 7 parallel to each other at intervals as detachable integral units inside a housing 15, it is possible to form flow paths 16 in which light irradiation treatments such as the eradication of bacteria in liquids, oxidative decomposition of organic matter or decomposition of harmful substances, etc., can be performed. Alternatively, in cases where the amount of ultraviolet irradiation treatment required is small, a single irradiating module 7 may be installed in a detachable manner inside a tube-form housing 15.

The operation of the device of the present invention may be described as follows:

Ultraviolet lamps 1 are accommodated inside transmitting tubes 2, each of which has an open end portion 2A at one end and a closed end portion 2B at the other end. The open end portions 2A of a plurality of said transmitting tubes 2 are inserted into respective connectors 4 fastened in place inside respective attachment rings 8 which are installed at intervals on a hollow frame 3. Since contacts which shield the tip portions of electrical lead wires 6 which are run through aforementioned hollow frame 3 are installed inside the cap-form holders 9 of the aforementioned connectors 4, the contacts of the electrical lead wires 6 and the contacts of the ultraviolet lamps 1 are connected.

One ultraviolet lamp 1 is inserted into each of the aforementioned cap-form holders 9; at the same time, the open end portion 2A of the corresponding transmitting tube 2 is fit over the outer surface of the holder 9, and packing 10 is installed on the outer surface of said transmitting tube 2. Furthermore, a cover 11 which has screw threads formed on its inside surface is screwed onto the screw threads of the attachment ring 8, so that the ultraviolet lamp 1 and transmitting tube 2 are attached to the frame 3 in a detachable, water-tight manner.

Furthermore, the closed end portions 2B of a plurality of transmitting tubes 2 containing ultraviolet lamps 1 are inserted into the supporters 14 of respective detachable holders 5, and screw threads formed on the tips of rotating screw rods 13 inserted into attachment holes 12 formed at intervals in the aforementioned frame 3 are screwed into screw threads formed in the end portions of the aforementioned supporters 14, so that the other ends of the aforementioned ultraviolet lamps 1 and the closed end portions 2B of the aforementioned transmitting tubes are supported in a detachable manner on the frame 3. In this way, an ultraviolet irradiating module 7 is formed.

Furthermore, by installing a plurality of the aforementioned integrated ultraviolet irradiating modules 7 parallel to each other at intervals as detachable integral units inside a housing 15, it is possible to form flow paths 16 in which liquids can be subjected to ultraviolet irradiation treatments. In this way, an ultraviolet irradiating device can be formed. In this case, a liquid containing bacteria, organic matter or harmful substances, etc., is caused to flow into the aforementioned flow paths 16 via a raw liquid inlet pipe formed in the housing 15. This liquid is irradiated with ultraviolet light from the ultraviolet lamps 1 contained in the aforementioned transmitting tubes 2, so that an ultraviolet irradiation treatment such as the eradication of bacteria contained in said liquid, the oxidative decomposition of organic matter or the decomposition of harmful substances, etc., is performed. Then, the treated liquid, which is free of such bacteria, organic matter or harmful substances, etc., is collected from the housing 15 via a treated liquid outlet pipe.

As the ultraviolet irradiation treatment of the aforementioned liquid is continued, contaminants such as organic matter, etc., contained in the liquid may adhere to the outer surfaces of the transmitting tubes 2, resulting in a drop in the amount of ultraviolet irradiation, or possibly causing damage or malfunctioning of the ultraviolet lamps 1. In such cases, the ultraviolet irradiating module 7 in which the problem has occurred is first removed from the housing 15 as a single unit.

Next, the rotating screw rods 13 of the detachable holders 5 which are screwed into the supporters 14 [of the ultraviolet lamps 1 which have a problem] are rotated in reverse so that said rotating screw rods 13 are withdrawn from the supporters 14, and the supporters 14 are removed from the closed end portions 2B of the corresponding transmitting tubes 2. Afterward, the covers 11 screwed onto the respective attachment rings 8 of the frame 3 are removed, and the ultraviolet lamps 1 are pulled out of the cap-form holders 9. At the same time, the open end portions 2A of the transmitting tubes 2 are pulled out toward the supporters 14, so that the transmitting tubes 2 containing the ultraviolet lamps 1 are removed from the frame 3. Then, the transmitting tubes 2 are cleaned, or the ultraviolet lamps 1 are replaced.

Then, the transmitting tubes 2 containing the ultraviolet lamps 1 are again attached to the frame 3 as described above so that the ultraviolet irradiating module 7 is reconstituted, and this module 7 is re-installed inside the housing 15, after which the ultraviolet irradiation treatment of the liquid can be re-started.

Furthermore, if cleaning parts 17 such as scrubbers, etc., which slide along the outer surfaces of the respective transmitting tubes 2 containing the ultraviolet lamps 1 are provided, and contaminants adhering to the outer surfaces of the transmitting tubes 2 are stripped away by these cleaning parts 17 while the aforementioned liquid is undergoing the aforementioned ultraviolet irradiation treatment, such contaminants will not cause any drop in the purity of the liquid being treated. In such a case, therefore, ultraviolet irradiation treatments of liquids can be performed continuously without any need to interrupt the treatment in order to clean the transmitting tubes 2. Accordingly, the treatment efficiency is greatly improved.

In the present invention, one end of each of a plurality of light-transmitting tubes containing light irradiating lamps is closed off; accordingly, there is no need to seal one end of each of said plurality of light-transmitting tubes. Furthermore, said light-transmitting tubes are attached in a detachable manner to respective connectors and detachable holders which are installed on the aforementioned frame, so that the attachment of the light-transmitting tubes containing the aforementioned light irradiating lamps to said frame is facilitated; accordingly, the construction of light irradiating modules is simplified, and said modules can be made more compact. In addition, a light irradiating device can easily be constructed in a short time by installing light irradiating modules constructed as described above parallel to each other at intervals as integral units inside a housing. Accordingly, the manufacturing cost of such a light irradiation treatment device can be reduced.

Furthermore, in the present invention, contaminated light-transmitting tubes or light-transmitting tubes containing disconnected or damage light irradiating lamps are not removed from the apparatus one by one. Instead, a light irradiating module consisting of a plurality of light-transmitting tubes containing light irradiating lamps can easily be removed as a unit by means of a one-touch operation. Then, the aforementioned connectors and detachable holders can be quickly and easily removed from the respective light-transmitting tubes, and all of the light irradiating lamps can be cleaned or removed in a short time. Accordingly, the following superior merits are obtained: i.e., the efficiency of light irradiation treatments of liquids can be improved, and the cost of such light irradiation treatments can be reduced.

Moreover, the present invention is not constructed so that a plurality of light-transmitting tubes containing light irradiating lamps are sealed to the aforementioned frame. Instead, said light-transmitting tubes are attached to the frame via connectors and detachable holders. Accordingly, the physical strength and attachment precision of the supporting structure of the light-transmitting tubes can be increased, and consequently, even if a considerable force is applied to the light-transmitting tubes attached to the frame while the light irradiating module is being carried or cleaned, the attachment of the light-transmitting tubes to the frame is securely maintained, so that there is no rupturing of seals of leakage of liquid. Moreover, the light irradiating lamps can be maintained at a uniform spacing inside the light-transmitting tubes, so that stable light irradiation can be maintained, thus making it possible to perform effective light irradiation treatments.

Furthermore, in the present invention, the electrical lead wires connected to the light irradiating lamps can be installed inside a hollow frame instead of being installed on the outside surfaces of said frame. Accordingly, the layout of the electrical lead wires can be improved, and damage or cutting of the electrical lead wires that might occur while the light irradiating module is being carried or cleaned can be prevented. Furthermore, since the electrical lead wires are covered by the frame and the aforementioned connectors in such a case, corrosion or deterioration that might be caused by ultraviolet light or ozone can also be prevented, thus eliminating the need for repair or replacement of the electrical lead wires, so that maintenance and control of the light irradiation treatment device are facilitated.

Moreover, in the present invention, if cleaning parts such as scrubbers, etc., which slide along the outer surfaces of the light-transmitting tubes containing the ultraviolet lamps are installed on said light-transmitting tubes, the automatic cleaning of contaminants adhering to the light-transmitting tubes (which has not been achievable in conventional light irradiation treatment devices) can be accomplished by forming a plurality of light irradiating modules into an integral unit. In such a case, furthermore, since contaminants are stripped away by the cleaning parts while the liquid is being subjected to the aforementioned light irradiation treatment, the purity of the liquid being treated is can be maintained, and such light irradiation treatments of liquids can be performed continuously without any need to interrupt the treatment and disassemble the device for cleaning. Thus, the efficiency of such light irradiation treatments can be greatly improved, and the cost of said treatments can be reduced considerably.

What is claimed is:

1. A light irradiating device with easily replaceable light irradiating lamps, comprising:
   a light irradiating module, comprising:
      a plurality of light irradiating lamps installed inside light-transmitting tubes, wherein each of the tubes has a length direction and is closed at one end of the length direction and open at the other end; and
      a frame including a plurality of connectors installed at intervals on the frame and a plurality of holders installed at intervals on the frame and adjustable along the length direction of the tubes, wherein the open end portions of a plurality of said light-transmitting tubes are attached in a water-tight manner to respective connectors and wherein the closed end portions of said plurality of light transmitting tubes are attached in a detachable manner to respective holders; and
   a cleaning mechanism movable along the length direction of the tubes and in sliding contact with the tubes, and
   a housing, wherein the light irradiating module is assembled as a detachable integral unit inside the housing, thus forming fluid flow paths inside the housing in which a light irradiation treatment of the fluid may be performed.

2. A light irradiating device, as defined in claim 1, wherein the frame is hollow, and wherein the light irradiating device further comprises a plurality of electrical lead wires installed inside the hollow frame, and wherein the electrical lead wires are connected to the light irradiating lamps installed on the hollow frame.

3. A light irradiating device, as defined in claim 1, wherein a plurality of the light irradiating modules are installed parallel to each other at spaced intervals as detachable integral units inside the housing.

4. A light irradiating device, as defined in claim 2, in which a plurality of the light irradiating modules are installed parallel to each other at spaced intervals as detachable integral units inside the housing.

5. A light irradiating device, as defined in claim 1, wherein the cleaning mechanism comprises a plurality of cleaning parts mounted to slide along the outside surfaces of the respective light-transmitting tubes and which are attached in a detachable manner, wherein contaminants adhering to the outside surfaces of the light-transmitting tubes are stripped from said light-transmitting tubes by these cleaning parts in the presence of the liquid being treated, during the light irradiation treatment of said liquid.

6. A light irradiating device, as defined in claim 2, wherein the cleaning mechanism comprises a plurality of cleaning parts mounted to slide along the outside surfaces of the respective light-transmitting tubes and which are attached in a detachable manner, wherein contaminants adhering to the outside surfaces of the light-transmitting tubes are stripped from said light-transmitting tubes by these cleaning parts in the presence of the liquid being treated, during the light irradiation treatment of said liquid.

7. A light irradiating device, as defined in claim 3, wherein the cleaning mechanism comprises a plurality of cleaning parts mounted to slide along the outside surfaces of the respective light-transmitting tubes and which are attached in a detachable manner, wherein contaminants adhering to the outside surfaces of the light-transmitting tubes are stripped from said light-transmitting tubes by these cleaning parts in the presence of the liquid being treated, during the light irradiation treatment of said liquid.

8. A light irradiating device, as defined in claim 1, wherein the holders are independently adjustable.

9. A light irradiating device, as defined in claim 1, wherein the holders are individually removable.

10. A light irradiating module adapted to be placed in a fluid flow path with easily replaceable light irradiating lamps, comprising:

a plurality of light irradiating lamps installed inside light-transmitting tubes, wherein each of the tubes has a length direction and is closed at one end of the length direction and open at the other end; and a frame including a plurality of connectors installed at intervals on the frame and a plurality of holders within the fluid flow path installed at intervals on the frame and adjustable along the length direction of the tubes, wherein the open end portions of a plurality of said light-transmitting tubes are attached in a water-tight manner to respective connectors and wherein the closed end portions of said plurality of light-transmitting tubes are attached in a detachable manner to respective holders; and a cleaning mechanism movable along the length direction of the tubes and in sliding contact with the tubes.

* * * * *